(12) United States Patent
Wang

(10) Patent No.: US 12,211,144 B2
(45) Date of Patent: Jan. 28, 2025

(54) IMAGE GENERATION METHOD AND APPARATUS

(71) Applicant: Huawei Technologies Co., Ltd., Shenzhen (CN)

(72) Inventor: Fengxia Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 17/922,246

(22) PCT Filed: Apr. 15, 2021

(86) PCT No.: PCT/CN2021/087574
§ 371 (c)(1),
(2) Date: Oct. 28, 2022

(87) PCT Pub. No.: WO2021/218649
PCT Pub. Date: Nov. 4, 2021

(65) Prior Publication Data
US 2023/0177768 A1    Jun. 8, 2023

(30) Foreign Application Priority Data

Apr. 30, 2020    (CN) .......................... 202010364283.3

(51) Int. Cl.
*G06T 17/00*    (2006.01)
*G06T 7/50*    (2017.01)
(Continued)

(52) U.S. Cl.
CPC ................ *G06T 17/00* (2013.01); *G06T 7/50* (2017.01); *G06T 11/00* (2013.01); *G06T 15/00* (2013.01);
(Continued)

(58) Field of Classification Search
None
See application file for complete search history.

(56) References Cited

U.S. PATENT DOCUMENTS

| 10,102,654 B1 | 10/2018 | Philips et al. |
| 10,210,664 B1 | 2/2019 | Chaturvedi |

(Continued)

FOREIGN PATENT DOCUMENTS

| CN | 107566751 A | 1/2018 |
| CN | 108682050 A | 10/2018 |

(Continued)

*Primary Examiner* — Jwalant Amin
(74) *Attorney, Agent, or Firm* — Conley Rose, P.C.

(57) ABSTRACT

An image generation method includes obtaining a first image of a photographed object and a first ambient light angle indicating a relative location relationship between an illumination light source and the photographed object when the first image is photographed; obtaining a first three-dimensional (3D) model that is generated through fusion based on depth information of the photographed object, a plurality of second images of the photographed object, and first lighting information, where the second images include a plurality of two-dimensional (2D) images obtained by photographing the photographed object from a plurality of angles of the photographed object, and where the first lighting information includes a first illumination angle that is the same as the first ambient light angle and a first light intensity; and generating a third image through fusion based on the first image and the first 3D model.

20 Claims, 4 Drawing Sheets

(51) Int. Cl.
  *G06T 11/00*    (2006.01)
  *G06T 15/00*    (2011.01)
  *G06T 15/50*    (2011.01)
  *G06T 19/20*    (2011.01)
  *H04N 5/265*    (2006.01)
  *G06T 19/00*    (2011.01)

(52) U.S. Cl.
  CPC ............ *G06T 15/506* (2013.01); *G06T 19/20* (2013.01); *H04N 5/265* (2013.01); *G06T 19/003* (2013.01); *G06T 2200/04* (2013.01); *G06T 2207/20221* (2013.01); *G06T 2207/30201* (2013.01); *G06T 2219/2012* (2013.01)

(56) References Cited

U.S. PATENT DOCUMENTS

| | | | |
|---|---|---|---|
| 11,826,016 B2 * | 11/2023 | Im | A61B 1/000095 |
| 2012/0019493 A1 * | 1/2012 | Barnhoefer | H05B 41/3922 |
| | | | 345/207 |
| 2017/0347040 A1 * | 11/2017 | Zhang | H04N 5/772 |
| 2019/0102871 A1 | 4/2019 | Huang | |
| 2019/0266789 A1 * | 8/2019 | Rezaiifar | G06T 15/80 |
| 2021/0110580 A1 | 4/2021 | Zheng et al. | |

FOREIGN PATENT DOCUMENTS

| | | | | |
|---|---|---|---|---|
| CN | 109242947 A | 1/2019 | | |
| CN | 111556255 A | 8/2020 | | |
| EP | 3382645 A2 * | 10/2018 | ............ | G06T 7/586 |

\* cited by examiner

IMAGE GENERATION METHOD AND APPARATUS

CROSS-REFERENCE TO RELATED APPLICATIONS

This is a U.S. National Stage of International Patent Application No. PCT/CN2021/087574 filed on Apr. 15, 2021, which claims priority to Chinese Patent Application Ser. No. 202010364283.3 filed on Apr. 30, 2020. Both of the aforementioned applications are hereby incorporated by reference in their entireties.

TECHNICAL FIELD

This application relates to the field of terminal device technologies, and in particular, to an image generation method and apparatus.

BACKGROUND

With continuous development of terminal device technologies, a plurality of photographing apparatuses may be disposed on a terminal device. The plurality of photographing apparatuses may include a front-facing camera, and a user may take a selfie by using the front-facing camera. However, when the user is in a low light environment, due to insufficient light, a three-dimensional sense and skin details of an image obtained by taking a selfie are usually missing, and there is more noise. Consequently, user experience is relatively poor.

Currently, to prevent affecting a selfie effect due to insufficient light, light filling is usually performed by using a display of a terminal device or a built-in illuminator. Specifically, when a user takes a selfie, the terminal device may detect ambient light luminance of a photographing environment. When the ambient light luminance is less than a specified luminance threshold, the display of the terminal device or the built-in illuminator may be enabled to fill light, to improve a photographing effect of an image. However, if light filling is performed by using the display or the built-in illuminator, a face can only receive light partially, and the luminance is limited. As a result, the three-dimensional sense and the skin details of the image obtained by taking a selfie are still missing, and the selfie effect is still poor, in addition, light filling may be further performed by using an external fill light device. In this manner, the selfie effect is relatively good, but the fill light device needs to be set by the user, and is inconvenient to carry. Consequently, user experience is relatively poor. Based on this, how to simply and efficiently eliminate impact on skin details and a three-dimensional sense in a selfie image due to insufficient light becomes a technical problem to be urgently resolved by persons skilled in the art.

SUMMARY

This application provides an image generation method and apparatus, to resolve a problem of how to simply and efficiently eliminate impact on skin details and a three-dimensional sense in a selfie image due to insufficient light.

According to a first aspect, this application provides an image generation method. The method includes: obtaining a first image of a photographed object and a first ambient light angle, where the first image is a three-dimensional image of the photographed object, and the first ambient light angle is used to indicate a relative location relationship between an illumination light source in a photographing environment and the photographed object when the first image is photographed; obtaining a first 3D model, where the first 3D model is a 3D model that is of the photographed object and that is generated through fusion based on depth information of the photographed object, a plurality of second images of the photographed object, and first lighting information, the plurality of second images are a plurality of two-dimensional images obtained by photographing the photographed object from a plurality of angles of the photographed object, the first lighting information includes a first illumination angle and a first light intensity, the first illumination angle is equal to the first ambient light angle, and luminance corresponding to the first light intensity is greater than or equal to a preset luminance threshold; and generating a third image of the photographed object through fusion based on the first image and the first 3D model.

By using a technical solution in this implementation, the first image of the photographed object and the first ambient light angle corresponding to the first image may be obtained. The first 3D model generated through fusion based on the depth information of the photographed object, the plurality of second images of the photographed object, and lighting information indicating that the photographed object is lighted from the first ambient light angle by using a lighting source with sufficient luminance may be obtained. Then, the third image of the photographed object may be generated based on the first image and the first 3D model. In other words, by using this technical solution, when a user takes a selfie in a low light environment by using a terminal device, the terminal device may fuse an actually photographed three-dimensional image with a 3D model generated based on the depth information of the photographed object, the plurality of second images of the photographed object, and the lighting information indicating that the photographed object is lighted from the first ambient light angle by using the lighting source with sufficient luminance, so that an actually obtained selfie image has a better three-dimensional sense and detail effects, no three-dimensional sense and skin details are missing, and user experience is better.

With reference to the first aspect, in a first possible implementation of the first aspect, the obtaining a first 3D model includes: obtaining a preset second 3D model, where the second 3D model is a 3D model that is of the photographed object and that is generated through fusion based on the depth information and the plurality of second images; obtaining the first lighting information; and generating the first 3D model through fusion based on the first lighting information and the second 3D model.

In this implementation, the preset second 3D model and the first lighting information may be obtained, and then the first 3D model is generated through fusion based on the first lighting information and the second 3D model. The obtained first 3D model is more accurate, and a three-dimensional sense and skin details of an image generated through subsequent photographing are richer, so that user experience is better.

With reference to the first aspect, in a second possible implementation of the first aspect, the method further includes: obtaining the depth information; obtaining the plurality of second images; and generating the second 3D model through fusion based on the depth information and the plurality of second images.

In this implementation, the second 3D model of the photographed object is first generated based on the depth information of the photographed object and two-dimensional information that is of the photographed object and that is obtained from the plurality of angles, and then the first 3D model is generated based on the lighting information corresponding to the first ambient light angle and the second 3D model. The obtained first 3D model is more accurate, and the three-dimensional sense and the skin details of the image generated through subsequent photographing are richer, so that user experience is better.

With reference to the first aspect, in a third possible implementation of the first aspect, the obtaining a first 3D model includes: obtaining the first 3D model from a plurality of preset third 3D models. The plurality of third 3D models are 3D models that are of a plurality of the photographed objects and that are generated based on the depth information, the plurality of second images, and a plurality of pieces of second lighting information. Each piece of the second lighting information includes a different second illumination angle. The first 3D model is a third 3D model corresponding to the second illumination angle that is the same as the first ambient light angle.

In this implementation, the first 3D model may be obtained from the plurality of preset third 3D models based on an angle matching manner. By using the method in this implementation, the first 3D model may be simply and quickly obtained, so that an image whose three-dimensional sense and skin details are richer is quickly obtained, and applicability is better.

With reference to the first aspect, in a fourth possible implementation of the first aspect, the obtaining a first image of a photographed object and a first ambient light angle includes: obtaining ambient light luminance of the photographed object; and if the ambient light luminance is less than the preset luminance threshold, obtaining the first image of the photographed object and the first ambient light angle.

In this implementation, the ambient light luminance of the photographed object is first obtained. Then, when the ambient light luminance is less than the preset luminance threshold, the first image of the photographed object and the first ambient light angle are obtained. In other words, in the technical solution of this implementation, the image is obtained by using the technical solution provided in this application only when the ambient light luminance is less than the preset luminance threshold. This can not only ensure that a three-dimensional sense and details of the photographed image in a low light environment are not missing, but also avoid a waste of resources.

With reference to the first aspect, in a fifth possible implementation of the first aspect, the method further includes: calibrating key points on the first 3D model. The generating a third image of the photographed object through fusion based on the first image and the first 3D model includes: performing matching of the key points on the first image and the first 3D model; and generating the third image through fusion based on the first image and the first 3D model after matching.

In this implementation, with reference to a key point matching technology, an actually photographed first image and the first 3D model are fused into an actually required image, to obtain the image whose three-dimensional sense and details are richer, so that user experience is better.

According to a second aspect, this application provides an image generation apparatus. The apparatus includes: a first obtaining module, configured to obtain a first image of a photographed object and a first ambient light angle, where the first image is a three-dimensional image of the photographed object, and the first ambient light angle is used to indicate a relative location relationship between an illumination light source in a photographing environment and the photographed object when the first image is photographed; a second obtaining module, configured to obtain a first 3D model, where the first 3D model is a 3D model that is of the photographed object and that is generated through fusion based on depth information of the photographed object, a plurality of second images of the photographed object, and first lighting information, the plurality of second images are a plurality of two-dimensional images obtained by photographing the photographed object from a plurality of angles of the photographed object, the first lighting information includes a first illumination angle and a first light intensity, the first illumination angle is equal to the first ambient light angle, and luminance corresponding to the first light intensity is greater than or equal to a preset luminance threshold; and a fusion module, configured to generate a third image of the photographed object through fusion based on the first image and the first 3D model.

The apparatus in this implementation may obtain the first image of the photographed object and the first ambient light angle corresponding to the first image, may obtain the first 3D model generated through fusion based on the depth information of the photographed object, the plurality of second images of the photographed object, and lighting information indicating that the photographed object is lighted from the first ambient light angle by using a lighting source with sufficient luminance, and then may generate the third image of the photographed object based on the first image and the first 3D model. In other words, when a user takes a selfie in a low light environment by using the apparatus, the apparatus may fuse an actually photographed three-dimensional image with a 3D model generated based on the depth information of the photographed object, the plurality of second images of the photographed object, and the lighting information indicating that the photographed object is lighted from the first ambient light angle by using the lighting source with sufficient luminance, so that an actually obtained selfie image has a better three-dimensional sense and detail effects, no three-dimensional sense and skin details are missing, and user experience is better.

With reference to the second aspect, in a first possible implementation of the second aspect, the second obtaining module is specifically configured to: obtain a preset second 3D model, where the second 3D model is a 3D model that is of the photographed object and that is generated through fusion based on the depth information and the plurality of second images; obtain the first lighting information; and generate the first 3D model through fusion based on the first lighting information and the second 3D model.

The apparatus in this implementation may obtain the preset second 3D model and the first lighting information, and then generate the first 3D model through fusion based on the first lighting information and the second 3D model. By using the apparatus in this implementation, the obtained first 3D model is more accurate, and a three-dimensional sense and skin details of an image generated through subsequent photographing are richer, so that user experience is better.

With reference to the second aspect, in a second possible implementation of the second aspect, the fusion module is further configured to: obtain the depth information; obtain the plurality of second images; and generate the second 3D model through fusion based on the depth information and the plurality of second images.

The apparatus in this implementation first generates the second 3D model of the photographed object based on the depth information of the photographed object and two-dimensional information that is of the photographed object and that is obtained from the plurality of angles, and then generates the first 3D model based on the lighting information corresponding to the first ambient light angle and the second 3D model. The obtained first 3D model is more accurate, and the three-dimensional sense and the skin details of the image generated through subsequent photographing are richer, so that user experience is better.

With reference to the second aspect, in a third possible implementation of the second aspect, the second obtaining module is specifically configured to obtain the first 3D model from a plurality of preset third 3D models. The plurality of third 3D models are 3D models that are of a plurality of the photographed objects and that are generated based on the depth information, the plurality of second images, and a plurality of pieces of second lighting information. Each piece of the second lighting information includes a different second illumination angle. The first 3D model is a third 3D model corresponding to the second illumination angle that is the same as the first ambient light angle.

The apparatus in this implementation may obtain the first 3D model from the plurality of preset third 3D models based on an angle matching manner. By using the apparatus in this implementation, the first 3D model may be simply and quickly obtained, so that an image whose three-dimensional sense and skin details are richer is quickly obtained, and applicability is better.

With reference to the second aspect, in a fourth possible implementation of the second aspect, the first obtaining module is specifically configured to: obtain ambient light luminance of the photographed object: and if the ambient light luminance is less than the preset luminance threshold, obtain the first image of the photographed object and the first ambient light angle.

The apparatus in this implementation first obtains the ambient light luminance of the photographed object, and then obtains the first image of the photographed object and the first ambient light angle when the ambient light luminance is less than the preset luminance threshold. In other words, the apparatus obtains the image by using the technical solution provided in this application only when the ambient light luminance is less than the preset luminance threshold. This can not only ensure that a three-dimensional sense and details of the photographed image in a low light environment are not missing, but also avoid a waste of resources.

With reference to the second aspect, in a fifth possible implementation of the second aspect, the apparatus further includes: a calibration module, configured to calibrate key points on the first 3D model. The fusion module is specifically configured to: perform matching of the key points on the first image and the first 3D model; and generate the third image through fusion based on the first image and the first 3D model after matching.

The apparatus in this implementation fuses an actually photographed first image and the first 3D model into an actually required image with reference to a key point matching technology, to obtain the image whose three-dimensional sense and details are richer, so that user experience is better.

According to a third aspect, an embodiment of this application provides an apparatus. The apparatus includes a processor, and when the processor executes a computer program or instructions in a memory, the method according to the first aspect is performed.

According to a fourth aspect, an embodiment of this application provides an apparatus. The apparatus includes a processor and a memory. The memory is configured to store a computer program or instructions, and the processor is configured to execute the computer program or the instructions stored in the memory, to enable the apparatus to perform the corresponding method according to the first aspect.

According to a fifth aspect, an embodiment of this application provides an apparatus. The apparatus includes a processor, a memory, and a transceiver. The transceiver is configured to receive a signal or send a signal. The memory is configured to store a computer program or instructions. The processor is configured to invoke the computer program or the instructions from the memory to perform the method according to the first aspect.

According to a sixth aspect, an embodiment of this application provides an apparatus. The apparatus includes a processor and an interface circuit. The interface circuit is configured to: receive a computer program or instructions and transmit the computer program or the instructions to the processor. The processor runs the computer program or the instructions to perform the corresponding method according to the first aspect.

According to a seventh aspect, an embodiment of this application provides a computer storage medium. The computer storage medium is configured to store a computer program or instructions, and when the computer program or the instructions are executed, the method according to the first aspect is implemented.

According to an eighth aspect, an embodiment of this application provides a computer program product including a computer program or instructions. When the computer program or the instructions are executed, the method according to the first aspect is implemented.

To resolve a problem of how to simply and efficiently eliminate impact on skin details and a three-dimensional sense in a selfie image due to insufficient light, this application provides an image generation method and apparatus. In the method, the first image of the photographed object and the first ambient light angle corresponding to the first image may be obtained. The first 3D model generated based on the depth information of the photographed object, the plurality of second images of the photographed object, and lighting information indicating, that the photographed object is lighted from the first ambient light angle by using a lighting source with sufficient luminance may be obtained. Then the third image of the photographed object may be generated based on the first image and the first 3D model. According to the method, when a user takes a selfie in a low light environment by using a terminal device, the terminal device may fuse an actually photographed three-dimensional image with a 3D model generated based on the depth information of the photographed object, the plurality of second images of the photographed object, and the lighting information indicating that the photographed object is lighted from the first ambient light angle by using the lighting source with sufficient luminance, so that an actually obtained selfie image has a better three-dimensional sense and detail effects, no three-dimensional sense and skin details are missing, and user experience is better.

DESCRIPTION OF EMBODIMENTS

Figure 1:
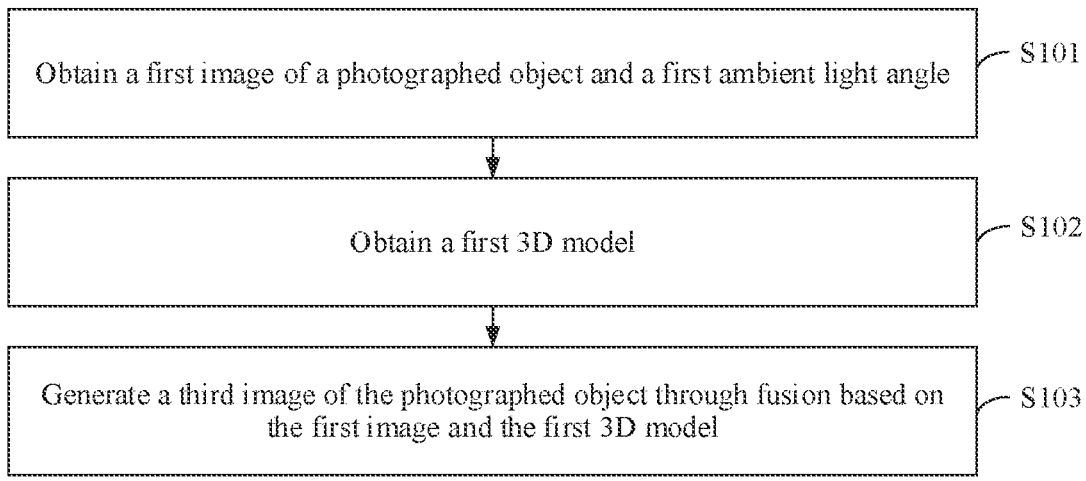
FIG. 1 is a schematic flowchart of an implementation of an image generation method according to this application.

The following describes technical solutions of this application with reference to the accompanying drawings.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, the word "example", "for example", or the like is used to represent giving an example, an illustration, or a description. Any embodiment or design scheme described as an "example" or "for example" in this application should not be explained as being more preferred or having more advantages than another embodiment or design scheme. Exactly, use of the word "example" or "for example" or the like is intended to present a relative concept in a specific manner.

To facilitate understanding of the technical solutions of this application, the following first describes an example of an application scenario of the technical solutions provided in this application.

Currently, a front-facing camera is usually disposed on a terminal device, and a user may take a selfie by using the front-facing camera. Optionally, the user may take a selfie on any body part of the user, for example, a face, a neck, or an arm.

When the user takes a selfie on the face in a low light environment with insufficient light, a three-dimensional sense and skin details in a face image obtained by taking a selfie are usually missing, and there is more noise in the face image. Consequently, user experience is relatively poor. To enhance the three-dimensional sense and an effect of the skin details of the face image, an illuminator may be disposed inside the terminal device. When the terminal device detects that ambient light luminance in a photographing environment is less than a preset luminance threshold, the illuminator may be enabled to fill light, or a display of the terminal device may be enabled to fill light. However, when the internal illuminator or the display is used to fill light, the face can only receive light partially, and light is still insufficient. As a result, the three-dimensional sense and the skin details are still missing in an obtained selfie image.

In addition, to ensure that the three-dimensional sense and the skin details in the face image obtained by taking a selfie are not missing, a fill light device may be further disposed outside the terminal device. For example, an external fill light device may be installed on the terminal device. When taking a selfie in a low light environment, the user may manually enable the external fill light device to fill light. This improves a photographing effect of a selfie image and eliminates loss of the three-dimensional sense and the skin details in the image. However, when a fill-in light device is disposed outside the terminal device, in an aspect, the user needs to additionally carry the fill light device, which increases a burden of the user, and in another aspect, the user needs to continuously manually enable or disable the fill light device, resulting in inconvenient use and poor user experience.

Based on this, how to simply and efficiently eliminate impact on loss of a three-dimensional sense and skin details in a selfie image due to insufficient light becomes a technical problem to be urgently resolved by persons skilled in the art.

To resolve the foregoing technical problem, embodiments of this application provide the following technical solutions. For specific content of the technical solutions, refer to the following descriptions.

The technical solutions provided in embodiments of this application may be applied to a terminal device. The terminal device may be user equipment (user equipment, UE). For example, the UE, may be a mobile phone (mobile phone), a tablet computer (portable android device, Pad), a personal digital assistant (personal digital assistant, PDA), or the like.

At least one photographing apparatus may be disposed on the terminal device. The at least one photographing apparatus may be configured to photograph a three-dimensional image, or may be configured to photograph a two-dimensional image. For example, the at least one photographing apparatus may be a depth camera, a structured light camera, or the like. In addition, the at least one photographing apparatus may include a front-facing camera, and a user may use the front-facing camera to take a selfie. It should be noted that the terminal device may further include more or fewer components. For example, the terminal device may further include a processor, a memory, a transceiver, a display, and the like. This is not limited in this application.

With reference to the accompanying drawings, the following specifically describes the technical solutions provided in embodiments of this application.

FIG. 1 is a schematic flowchart of an implementation of an image generation method according to this application. The method includes the following steps.

Step S101: Obtain a first image of a photographed object and a first ambient light angle.

The photographed object is a person, a part of a human body, an object, or the like that are to be photographed. For example, when a user takes a selfie by using a terminal device, the photographed object may be a face, a neck, an arm, or the like. It should be noted that the image generation method provided in this application is not limited to a selfie application scenario, and is also applicable to another photographing scenario of any person or object. This is not limited in this application. The following describes in detail embodiments of the technical solutions provided in this application by using an example in which the photographed object is a face during selfie-taking.

The first image is a three-dimensional image of the photographed object. During selfie-taking, the first image may be obtained by using a front-facing camera of the terminal device. Further, when the user takes a selfie, a two-dimensional image generated from the selfie of the user may be obtained, depth information of the photographed object is also obtained, and then the first image is generated based on the two-dimensional image and the depth information. The first ambient light angle is used to indicate a relative location relationship between an illumination light source in a photographing environment and the photographed object when the first image is photographed. After the first image of the photographed object is obtained, the first image may be analyzed by using a structured light technology, to obtain the first ambient light angle, that is, the relative location relationship between the illumination light source in the photographing environment and the photographed object when the photographed first image is obtained through analysis by using the structured light technology.

For example, the following three-dimensional coordinate system may be established in a system of the terminal device. A front of the face is a positive direction of a Z-axis, a top of the face is a positive direction of a Y-axis, a line between two ears is a direction of an X-axis, and a positive direction of the X-axis is from a left ear to a right ear. Based on the three-dimensional coordinate system, the first ambient light angle may be obtained by deflecting 30 degrees from the positive direction of the Y-axis to the positive direction of the X-axis, indicating that the illumination light source is located in a direction that is on a right ear side of the face and that deviates from the right ear by 30 degrees. Alternatively, the first ambient light angle may be obtained by first deflecting 30 degrees from the positive direction of the Y-axis to the positive direction of the X-axis, and then deflecting 20 degrees to the positive direction of the Z-axis, indicating that the illumination light source is located in a direction that deflects 30 degrees from the top of the face to the right ear side, and then deflects 20 degrees to the front of the face. By analogy, the first ambient light angle may also be obtained otherwise. Other examples are not enumerated one by one herein.

In addition, in some optional embodiments of this application, ambient light luminance of the photographed object, that is, luminance of the illumination light source in the photographing environment, may be first obtained. Then, when the ambient light luminance is less than a preset luminance threshold, the first image of the photographed object and the first ambient light angle are obtained. In other words, only in a low light environment, the terminal device obtains the first image of the photographed object and the first ambient light angle, and performs subsequent steps in this solution, so that an image in which no three-dimensional sense and details are missing can be obtained more flexibly and efficiently, and user experience is better.

The preset luminance threshold may be set based on a requirement in an actual application scenario.

Step S102: Obtain a first 3D model.

The first 3D model is a 3D model that is of the photographed object and that is generated through fusion based on the depth information of the photographed object, a plurality of second images of the photographed object, and first lighting information.

There may be a plurality of implementations of obtaining the first 3D model.

Figure 2:
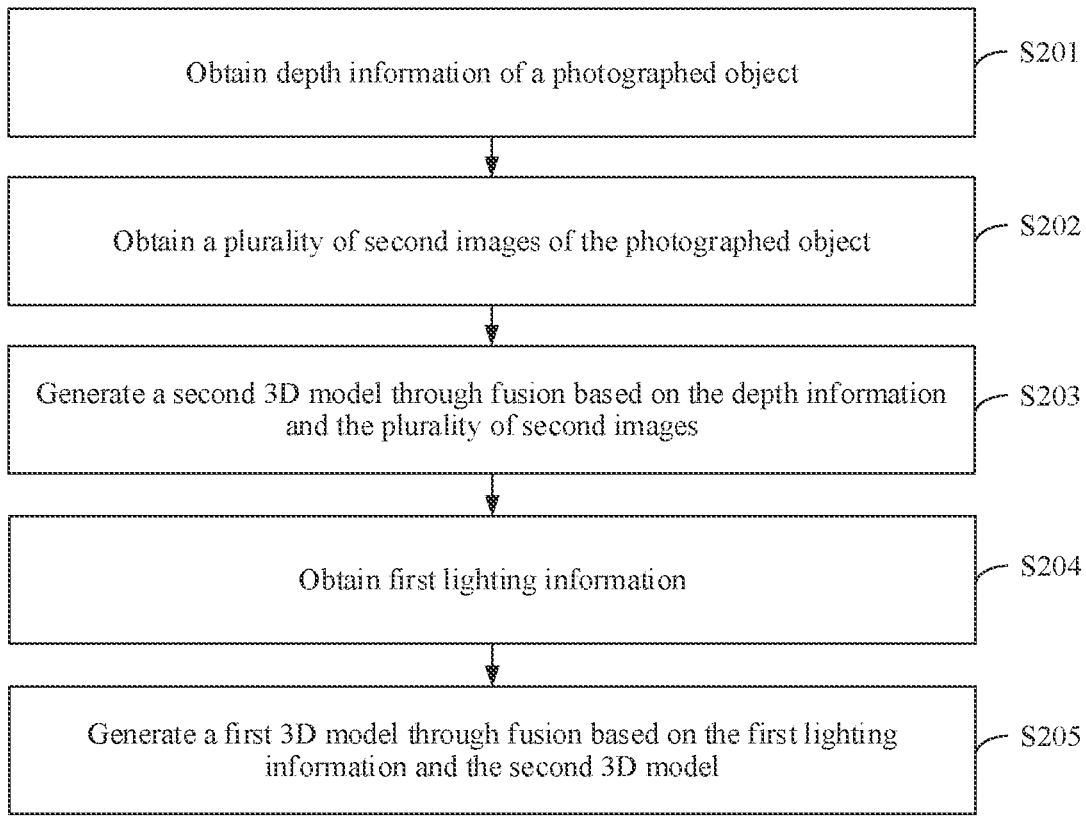
FIG. 2 is a schematic flowchart of an implementation of a method for obtaining a first 3D model according to this application.

Optionally, for an implementation of obtaining the first 3D model, refer to FIG. 2. FIG. 2 is a schematic flowchart of an implementation of a method for obtaining the first 3D model according to this application. It can be learned with reference to FIG. 2 that the method may include the following steps.

Step S201: Obtain the depth information of the photographed object.

The depth information of the photographed object refers to information about a visual depth of the photographed object, for example, a height at which a nose tip on a face protrudes from the face, a height at which a forehead on a face protrudes from the face, or a height at which a lip bead of a mouth on a face protrudes from the face.

The terminal device may perform three-dimensional scanning on the photographed object by using a photographing apparatus disposed on the terminal device, for example, a front-facing camera, to obtain the depth information of the photographed object.

Step S202: Obtain the plurality of second images of the photographed object.

The plurality of second images are a plurality of two-dimensional images obtained by photographing the photographed object from a plurality of angles of the photographed object.

That the plurality of two-dimensional images are obtained by photographing the photographed object from a plurality of angles of the photographed object means that the photographed object is photographed by changing a relative location relationship between the photographing apparatus and the photographed object for a plurality of times, to obtain one two-dimensional image after photographing for each time, and obtain the plurality of two-dimensional images after photographing for a plurality of times.

An example in which the photographed object is a face during selfie-taking is used for description. The face may be separately photographed from a plurality of angles such as the front of the face, both sides of the face, the top of the face, and the bottom of the face, to obtain a plurality of two-dimensional images of the face.

When the step S202 is performed, there may be a plurality of implementations of obtaining the plurality of second images of the photographed object.

For example, before an image is generated according to the method shown in FIG. 1 in this application for the first time, the photographed object may be photographed in advance from a plurality of angles of the photographed object. In other words, a relative position between the photographing apparatus of the terminal device and the photographed object is changed for a plurality of times, one second image is obtained by photographing after the relative position is changed for each time, the plurality of second images are obtained after the relative position is changed for a plurality of times, and then the plurality of obtained second images are stored in the terminal device. Then, when the step S202 is performed, the plurality of prestored second images may be directly read from the terminal device, for example, a plurality of two-dimensional images of the face may be obtained by taking a selfie in advance from the front and the top of the face, in any angle deflected from the front of the face to the left of the face, in any angle deflected from the front of the face to the right of the face, in any angle deflected from the front of the face to the top of the face, and in any angle deflected from the front of the face to the bottom of the face. Then, the plurality of two-dimensional images of the face are stored in the terminal device as the second images. When the step S202 is performed, the plurality of prestored two-dimensional images of the face may be directly read from the terminal device.

For example, alternatively, when the step S202 is performed, prompt information may be first output. The prompt information is used to prompt the user to photograph the photographed object from the plurality of angles of the photographed object by using the photographing apparatus of the terminal device, to obtain the plurality of two-dimensional images of the photographed object. Then, the plurality of two-dimensional images obtained by photographing the photographed object from the plurality of angles of the photographed object by the user by using the photographing apparatus of the terminal device are determined as the second images, to obtain the plurality of second images.

The prompt information may be text information, or may be voice information. This is not limited in this application.

For example, alternatively, when an image is generated for the first time according to the method shown in FIG. 1 in this application, and when the plurality of second images of the photographed object need to be obtained, prompt information may be first output to prompt the user to photograph the photographed object from the plurality of angles of the photographed object by using the photographing apparatus of the terminal device, to obtain the plurality of second images of the photographed object. Then, the plurality of second images obtained for the first time may be stored in the terminal device. Then, each time the plurality of second images of the photographed object need to be obtained, the plurality of prestored second images are directly read from the terminal device.

Step S203: Generate a second 3D model through fusion based on the depth information and the plurality of second images.

After obtaining the depth information of the photographed object and the plurality of second images of the photographed object, the terminal device may generate the second 3D model through fusion based on the depth information and the plurality of second images by using a fusion processing technology.

Step S204: Obtain the first lighting information.

The first lighting information refers to information indicating that a to-be-lighted object is lighted from a first illumination angle by using a lighting source. The lighting source may be a physical light source, or may be a virtual light source set based on a 3D lighting technology. The to-be-lighted object may be a photographed object, for example, a face, or may be a virtual object, for example, the second 3D model.

The first lighting information may include the first illumination angle and a first light intensity, and may further include a first color temperature and the like. The first illumination angle is equal to the first ambient light angle. Luminance corresponding to the first light intensity is greater than or equal to the preset luminance threshold. This can compensate for a disadvantage of insufficient luminance of the illumination light source in a low light environment, and avoid a case in which the three-dimensional sense and details are missing in an image obtained by photographing. The first color temperature is a color temperature of the lighting source, and may be equal to a color temperature of the illumination light source in the photographing environment.

There may be a plurality of manners of obtaining the first lighting information.

For example, before the image is generated according to the method shown in FIG. 1 in this application for the first time, second lighting information indicating simulating lighting of the second 3D model from each second illumination angle may be obtained in advance through calculation based on a plurality of second illumination angles by using the 3D lighting technology, to obtain a plurality of pieces of second lighting information. Each piece of second lighting information corresponds to a different second illumination angle. Then, each piece of second lighting information and a second illumination angle corresponding to each piece of second lighting information are correspondingly stored in the terminal device. Then, when the step S204 is performed, the second lighting information corresponding to the second illumination angle that is the same as the first ambient light angle may be read from the plurality of pieces of prestored second lighting information, and the second lighting information is determined as the first lighting information.

For example, alternatively, when the step S204 is performed, the first ambient light angle may be determined as the first illumination angle. Lighting information indicating simulating lighting of the second 3D model from the first illumination angle is obtained through calculation by using the 3D lighting technology, and the lighting information is determined as the first lighting information.

For example, alternatively, before the image is generated according to the method shown in FIG. 1 in this application for the first time, the user may be prompted to light the photographed object from the plurality of second illumination angles by using an external lighting source in advance. The photographing apparatus is used to obtain the second lighting information indicating lighting from each second illumination angle, to obtain a plurality of pieces of second lighting information. Each piece of second lighting information corresponds to a different second illumination angle. Then, each piece of second lighting information and a second illumination angle corresponding to each piece of second lighting information are correspondingly stored in the terminal device. Then, when the step S204 is performed, the second lighting information corresponding to the second illumination angle that is the same as the first ambient light angle may be read from the plurality of pieces of prestored second lighting information, and the second lighting information is determined as the first lighting information. Luminance of the external lighting source is greater than or equal to the preset luminance threshold. This can compensate for a disadvantage of insufficient luminance of the illumination light source in a low light environment, and avoid a case in which the three-dimensional sense and details are missing in an image obtained by photographing.

Step S205: Generate the first 3D model through fusion based on the first lighting information and the second 3D model.

After the first lighting information and the second 3D model are obtained, the first 3D model may be generated through fusion based on the first lighting information and the second 3D model with reference to the 3D lighting technology.

It should be noted that, alternatively, before the image is generated according to the method shown in FIG. 1 in this application for the first time, the second 3D model may be generated in advance according to the method shown in the step S201 to the step S203 in the embodiment shown in FIG. 2, and the second 3D model is stored in the terminal device. Then, each time the first 3D model is obtained according to the method shown in FIG. 2 in this application, the step S201 to the step S203 are not performed, but the prestored second 3D model is directly read from the terminal device. In this way, the first 3D model can be obtained more quickly and conveniently, and user experience is better.

Alternatively, when the image is generated according to the method shown in FIG. 1 in this application for the first time, the second 3D model may be generated according to the method shown in the step S201 to the step S203 in the embodiment shown in FIG. 2, and then the second 3D model is stored in the terminal device. Then, each time the first 3D model is obtained according to the method shown in FIG. 2 in this application, the step S201 to the step S203 are not performed, but the stored second 3D model is directly read from the terminal device.

Figure 3:
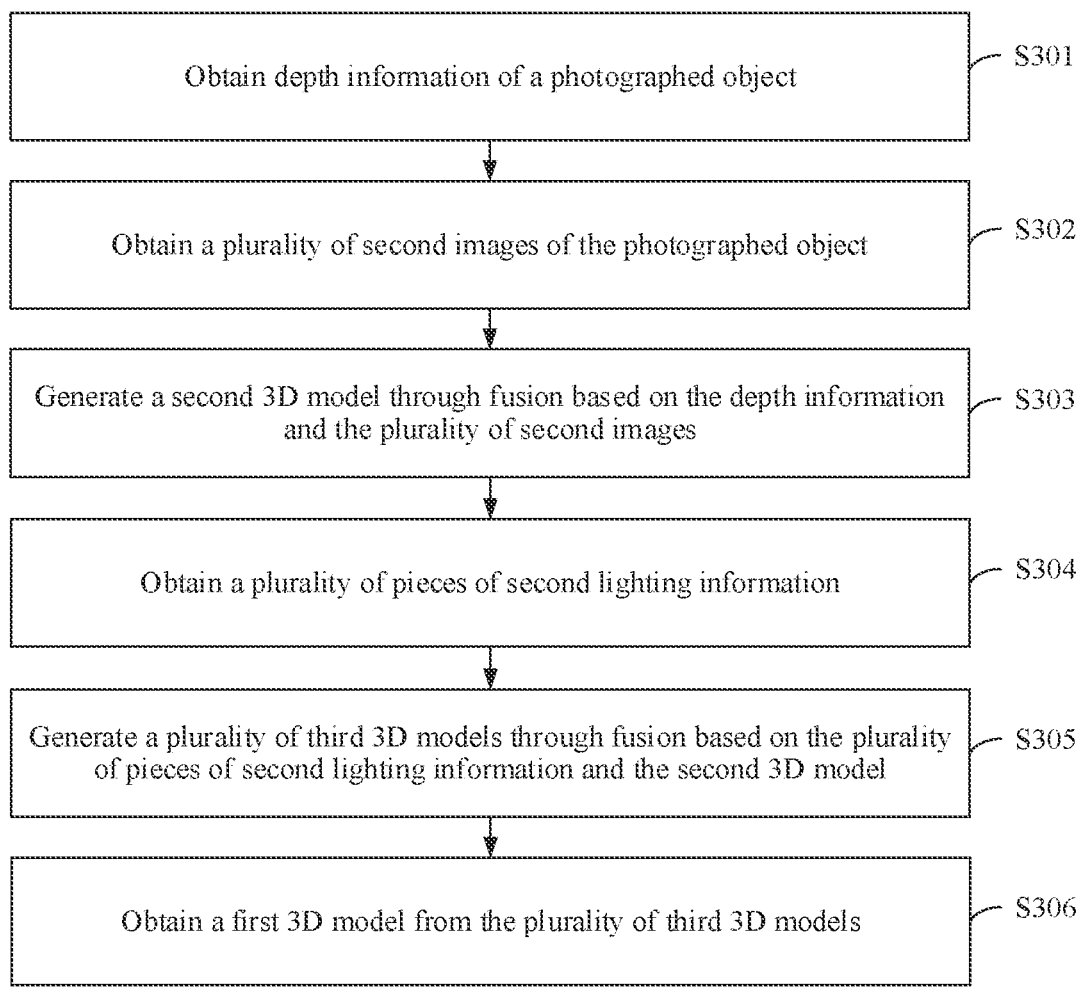
FIG. 3 is a schematic flowchart of another implementation of a method for obtaining a first 3D model according to this application.

Optionally, for an implementation of obtaining the first 3D model, further refer to FIG. 3. FIG. 3 is a schematic flowchart of another implementation of a method for obtaining the first 3D model according to this application. It can be learned with reference to FIG. 3 that the method may include the following steps.

Step S301: Obtain the depth information of the photographed object.

Step S302: Obtain the plurality of second images of the photographed object.

Step S303: Generate a second 3D model through fusion based on the depth information and the plurality of second images.

For implementations of the step S301 to the step S303, refer to the implementations of the step S201 to the step S203 the embodiment shown in FIG. 2. Details are not described herein again.

Step S304: Obtain a plurality of pieces of second lighting information.

The plurality of pieces of second lighting information refers to a plurality of pieces of lighting information obtained by lighting a to-be-lighted object from a plurality of second illumination angles by using a lighting source. Each piece of second lighting information corresponds to a different second illumination angle.

Each piece of second lighting information may include a second illumination angle, a second light intensity, and a second color temperature. Luminance corresponding to the second light intensity is greater than or equal to the preset luminance threshold. This can compensate for a disadvantage of insufficient luminance of the illumination light source in a low light environment, and avoid a case in which the three-dimensional sense and details are missing in an image obtained by photographing. The second color temperature is equal to a color temperature of the illumination light source in a photographing environment.

There may be a plurality of implementations of obtaining the plurality of pieces of second lighting information.

For example, before the image is generated according to the method shown in FIG. 1 in this application for the first time, second lighting information indicating simulating lighting of the second 3D model from each second illumination angle may be obtained in advance through calculation based on the plurality of second illumination angles by using the 3D lighting technology, to obtain the plurality of pieces of second lighting information. Each piece of second lighting information corresponds to a second illumination angle. Then, each piece of second lighting information and a second illumination angle corresponding to each piece of second lighting information are correspondingly stored in the terminal device. Then, when the step S304 is performed, the plurality of pieces of prestored second lighting information may be directly read from the terminal device.

For example, alternatively, before the image is generated according to the method shown in FIG. 1 in this application for the first time, the user may be prompted to light the photographed object from the plurality of second illumination angles by using an external lighting source in advance. The photographing apparatus is used to obtain lighting information indicating lighting from each second illumination angle. Then, the lighting information used as the second lighting information and the second illumination angle corresponding to the second lighting information are correspondingly stored in the terminal device. When the step S304 is performed, the plurality of pieces of prestored second lighting information may be directly read from the terminal device.

For example, when the step S304 is performed, second lighting information indicating simulating lighting of the second 3D model from each second illumination angle may be obtained through calculation based on the plurality of second illumination angles by using a 3D lighting technology, to obtain the plurality of pieces of second lighting information.

Step S305: Generate a plurality of third 3D models through fusion based on the plurality of pieces of second lighting information and the second 3D model.

After the plurality of pieces of second lighting information and the second 3D model are obtained, a third 3D model may be generated through fusion based on each piece of second lighting information and the second 3D model with reference to the 3D lighting technology. Each piece of second lighting information corresponds to a different second illumination angle. Based on this, each third 3D model also corresponds to a different second illumination angle.

Step S306: Obtain the first 3D model from the plurality of third 3D models.

After the plurality of third 3D models are obtained, a third 3D model corresponding to the second illumination angle that is the same as the first ambient light angle may be selected from the plurality of obtained third 3D models, and the third 3D model is determined as the first 3D model.

It should be noted that, alternatively, before the image is generated according to the method shown in FIG. 1 in this application for the first time, the second 3D model may be generated in advance according to the method shown in the step S301 to the step S303 in the embodiment shown in FIG. 3, and the second 3D model is stored in the terminal device. Then, each time the first 3D model is obtained according to the method shown in FIG. 3 in this application, the step S301 to the step S303 are not performed, but the prestored second 3D model is directly read from the terminal device. In this way, the first 3D model can be obtained more quickly and conveniently, and user experience is better.

Alternatively, when the image is generated according to the method shown in FIG. 1 in this application for the first time, the second 3D model may be generated according to the method shown in the step S301 to the step S303 in the embodiment shown in FIG. 3, and then the second 3D model is stored in the terminal device. Then, each time the first 3D model is obtained according to the method shown in FIG. 3 in this application, the step S301 to the step S303 are not performed, but the stored second 3D model is directly read from the terminal device.

Similarly, alternatively, before the image is generated according to the method shown in FIG. 1 in this application for the first time, the plurality of third 3D models may be generated in advance according to the method shown in the step S301 to the step S305 in the embodiment shown in FIG. 3, and each third 3D model and the second illumination angle corresponding to each third 3D model are correspondingly stored in the terminal device. Then, each time the first 3D model is obtained according to the method shown in FIG. 3 in this application, the step S301 to the step S305 are not performed, but the plurality of prestored third 3D models are directly read from the terminal device. In this way, the first 3D model can be obtained more quickly and conveniently, and user experience is better.

Alternatively, when the image is generated according to the method shown in FIG. 1 in this application for the first time, the plurality of third 3D models may be generated according to the method shown in the step S301 to the step S305 in the embodiment shown in FIG. 3, and then each third 3D model and the second illumination angle corresponding to each third 3D model are correspondingly stored in the terminal device. Then, each time the first 3D model is obtained according to the method shown in FIG. 3 in this application, the step S301 to the step S305 are not performed, but the plurality of stored third 3D models are directly read from the terminal device.

Figure 4:
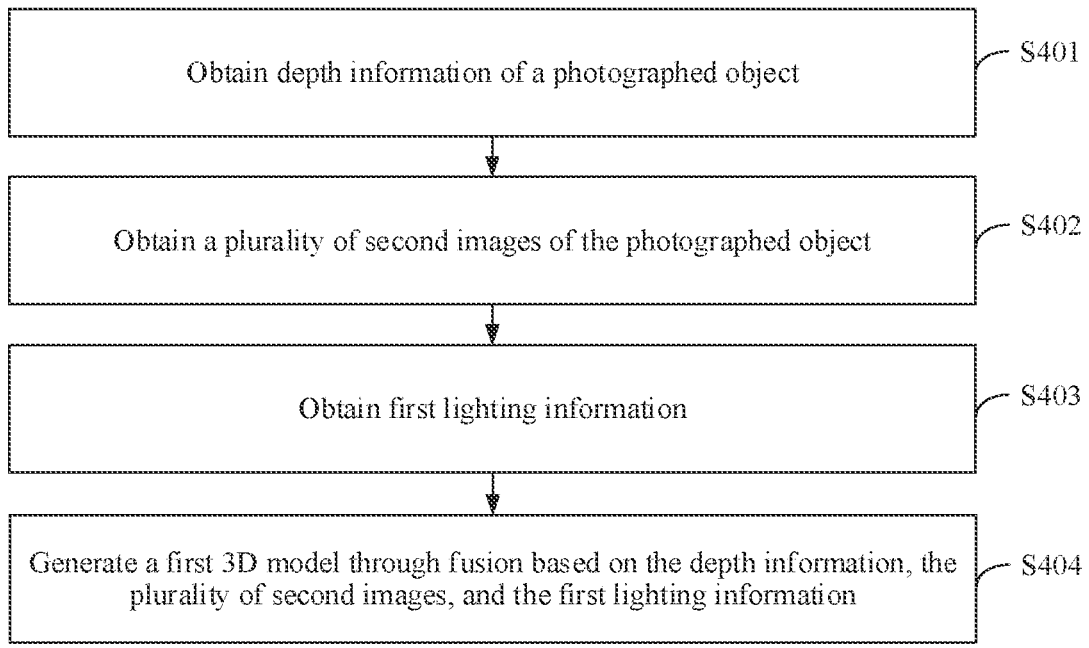
FIG. 4 is a schematic flowchart of still another implementation of a method for obtaining a first 3D model according to this application.

Optionally, for an implementation of obtaining the first 3D model, further refer to FIG. 4. FIG. 4 is a schematic flowchart of still another implementation of a method for obtaining the first 3D model according to this application. It can be learned with reference to FIG. 4 that the method may include the following steps.

Step S401: Obtain the depth information of the photographed object.

Step S402: Obtain the plurality of second images of the photographed object.

For implementations of the step S401 and the step S402, refer to the implementations of the step S201 and the step S202 in the embodiment shown in FIG. 2. Details are not described herein again.

Step S403: Obtain the first lighting information.

For implementations of the step S403, refer to the implementations of the step S204 in the embodiment shown in FIG. 2. Details are not described herein again.

Step S404: Generate the first 3D model through fusion based on the depth information, the plurality of second images, and the first lighting information.

After the depth information of the photographed object, the plurality of second images of the photographed object, and the first lighting information are obtained, the first 3D model may be generated through fusion based on the depth information, the plurality of second images, and the first lighting information with reference to the 3D lighting technology and a fusion processing technology.

Step S103: Generate a third image of the photographed object through fusion based on the first image and the first 3D model.

After the first image and the first 3D model are obtained, the third image of the photographed object may be generated through fusion based on the first image and the first 3D model. The third image is a three-dimensional image. A two-dimensional image corresponding to the third image may be used as a photographed image actually used by the user, and the two-dimensional image corresponding to the third image may be displayed on a display of the terminal device.

It should be noted that, if the luminance of the illumination light source in the photographing environment is greater than or equal to the preset luminance threshold, the method shown in FIG. 1 in this application may not be used to obtain the two-dimensional image, and a two-dimensional image photographed by the user may be directly displayed on the display. Alternatively, the method shown in FIG. 1 in this application may be used to first generate the third image, and then the two-dimensional image corresponding to the third image is displayed on the display. This is not limited in this application.

Optionally, key points may be further calibrated on the first 3D model, the second 3D model, and the third 3D model of the photographed object. For example, key points such as eyes, a nose, and a mouth may be calibrated on a face model. Similarly, the key points may be further calibrated on the first image. In this way, before the third image is generated through fusion, matching of the key points may be first performed on the first image and the first 3D model, and then the third image of the photographed object is generated through fusion based on the first image and the first 3D model after matching.

According to the image generation method provided in this embodiment of this application, the first image of the photographed object and the first ambient light angle corresponding to the first image may be obtained. The first 3D mod& generated based on the depth information of the photographed object, the plurality of second images of the photographed object, and lighting information indicating that the photographed object is lighted from the first ambient light angle by using a lighting source with sufficient luminance may be obtained. Then, the third image of the photographed object may be generated based on the first image and the first 3D model. According to the method, when a user takes a selfie in a low light environment by using a terminal device, the terminal device may fuse an actually photographed three-dimensional image with a 3D model generated based on the depth information of the photographed object, the plurality of second images of the photographed object, and the lighting information indicating that the photographed object is lighted from the first ambient light angle by using the lighting source with sufficient luminance, so that an actually obtained selfie image has better three-dimensional sense and detail effects, no three-dimensional sense and skin details are missing, and user experience is better.

The method embodiments described in this specification may be independent solutions, or may be combined based on internal logic. These solutions all fall within the protection scope of this application.

It may be understood that in the foregoing method embodiments, the methods and operations implemented by the terminal device may alternatively be implemented by a component (for example, a chip or a circuit) that can be used in the terminal device.

The foregoing mainly describes the solutions provided in embodiments of this application from a perspective of interaction between network elements. It may be understood that, to implement the foregoing functions, each of network elements such as the terminal device includes a corresponding hardware structure and/or software module for performing each function. Persons skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

In embodiments of this application, the terminal device may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that, in embodiments of this application, module division is an example, and is merely logical function division. In an actual implementation, another division manner may be used. An example in which each function module is obtained through division based on each corresponding function is used below for description.

The methods provided in embodiments of this application are described above in detail with reference to FIG. 1 to FIG. 4. Apparatuses provided in embodiments of this application are described below in detail with reference to FIG. 5 and FIG. 6. It should be understood that descriptions of apparatus embodiments correspond to the descriptions of the method embodiments. Therefore, for content that is not described in detail, refer to the foregoing method embodiments. For brevity, details are not described herein again.

Figure 5:
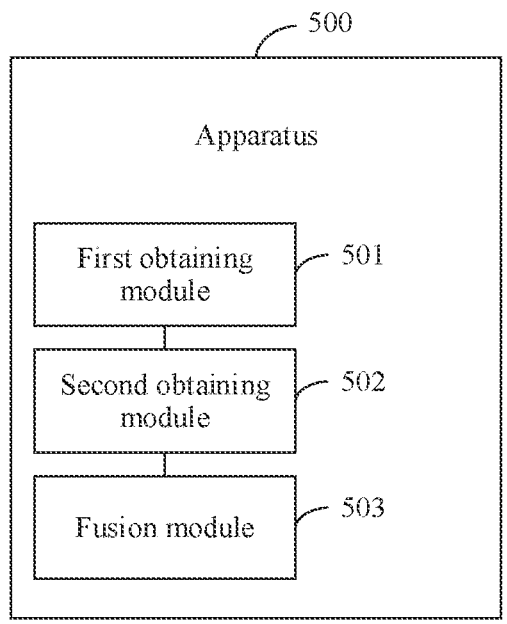
FIG. 5 is a block diagram of a structure of an implementation of an image generation apparatus according to this application.

FIG. 5 is a block diagram of a structure of an implementation of an image generation apparatus according to this application. As shown in FIG. 5, the apparatus 500 may include a first obtaining module 501, a second obtaining module 502, and a fusion module 503. The apparatus 500 may be configured to perform an action performed by the terminal device in the foregoing method embodiments.

For example, the first obtaining module 501 is configured to obtain a first image of a photographed object and a first ambient light angle. The first image is a three-dimensional image of the photographed object. The first ambient light angle is used to indicate a relative location relationship between an illumination light source in a photographing environment and the photographed object when the first image is photographed.

The second obtaining module 502 is configured to obtain a first 3D model. The first 3D model is a 3D model that is of the photographed object and that is generated through fusion based on depth information of the photographed object, a plurality of second images of the photographed object, and first lighting information. The plurality of second images are a plurality of two-dimensional images obtained by photographing the photographed object from a plurality of angles of the photographed object. The first lighting information includes a first illumination angle and a first light intensity, the first illumination angle is equal to the first ambient light angle, and luminance corresponding to the first light intensity is greater than or equal to a preset luminance threshold.

The fusion module 503 is configured to generate a third image of the photographed object through fusion based on the first image and the first 3D model.

Optionally, the second obtaining module 502 is specifically configured to: obtain a preset second 3D model, where the second 3D model is a 3D model that is of the photographed object and that is generated through fusion based on the depth information and the plurality of second images; obtain the first lighting information; and generate the first 3D model through fusion based on the first lighting information and the second 3D model.

Optionally, the fusion module 503 is further configured to: obtain the depth information; obtain the plurality of second images; and generate the second 3D model through fusion based on the depth information and the plurality of second images.

Optionally, the second obtaining module 502 is specifically configured to obtain the first 3D model from a plurality of preset third 3D models. The plurality of third 3D models are 3D models that are of a plurality of the photographed objects and that are generated based on the depth information, the plurality of second images, and a plurality of pieces of second lighting information. Each piece of the second lighting information includes a different second illumination angle. The first 3D model is a third 3D model corresponding to the second illumination angle that is the same as the first ambient light angle.

Optionally, the first obtaining module 501 is specifically configured to: obtain ambient light luminance of the photographed object; and if the ambient light luminance is less than the preset luminance threshold, obtain the first image of the photographed object and the first ambient light angle.

Optionally, the apparatus 500 may further include: a calibration module, configured to calibrate key points on the first 3D model. The fusion module 503 is specifically configured to: perform matching of the key points on the first image and the first 3D model; and generate the third image through fusion based on the first image and the first 3D model after matching.

In other words, the apparatus 500 may implement steps or procedures corresponding to those performed by the terminal device in the method shown in FIG. 1, FIG. 2, FIG. 3, or FIG. 4 according to embodiments of this application. The apparatus 500 may include modules configured to perform the method performed by the terminal device in the method shown in FIG. 1, FIG. 2, FIG. 3, or FIG. 4. In addition, the modules in the apparatus 500 and the foregoing other operations and/or functions are separately used to implement corresponding steps of the method shown in FIG. 1, FIG. 2, FIG. 3, or FIG. 4. For example, in a possible design, the first obtaining module 501 in the apparatus 500 may be configured to perform the step S101 in the method shown in FIG. 1, the second obtaining module 502 may be configured to perform the step S102 in the method shown in FIG. 1, and the fusion module 503 may be configured to perform the step S103 in the method shown in FIG. 1. In another possible design, the second obtaining module 502 in the apparatus 500 may be further configured to perform the step S201 to the step S205 in the method shown in FIG. 2. In another possible design, the second obtaining module 502 in the apparatus 500 may be further configured to perform the step S301 to the step S306 in the method shown in FIG. 3. In another possible design, the second obtaining module 502 in the apparatus 500 may be further configured to perform the step S401 to the step S404 in the method shown in FIG. 4.

It should be understood that a specific process in which the modules perform the foregoing corresponding steps is described in detail in the foregoing method embodiments. For brevity, details are not described herein.

In addition, the apparatus 500 may be a terminal device. The terminal device may perform functions of the terminal device in the foregoing method embodiments, or implement steps or procedures performed by the terminal device in the foregoing method embodiments.

The terminal device may include a processor and a transceiver. Optionally, the terminal device may further include a memory. The processor, the transceiver, and the memory may communicate with each other through an internal connection path, and transfer a control signal and/or a data signal. The memory is configured to store a computer program or instructions, and the processor is configured to: invoke the computer program or the instructions from the memory and run the computer program or the instructions, to control the transceiver to receive and/or send a signal. Optionally, the terminal device may further include an antenna, configured to send, by using a radio signal, uplink data or uplink control signaling output by the transceiver.

The processor and the memory may be integrated into a processing apparatus, and the processor is configured to execute the computer program or the instructions stored in the memory to implement the foregoing functions. In a specific implementation, the memory may be integrated into the processor, or independent of the processor. The processor may correspond to the fusion module in FIG. 5.

The transceiver may also be referred to as a transceiver unit. The transceiver may include a receiver (or referred to as a receiver machine or a receiver circuit) and/or a transmitter (or referred to as a transmitter machine or a transmitter circuit). The receiver is configured to receive a signal, and the transmitter is configured to send a signal.

It should be understood that the terminal device can implement processes related to the terminal device in the foregoing method embodiments. Operations and/or functions of the modules in the terminal device are intended to implement the corresponding procedures in the foregoing method embodiments. For details, refer to the descriptions in the foregoing method embodiments, To avoid repetition, detailed descriptions are properly omitted herein.

Optionally, the terminal device may further include a power supply, configured to supply power to various components or circuits in the terminal device.

In addition, to improve the functions of the terminal device, the terminal device may further include one or more of an input unit, a display unit, an audio circuit, a camera, a sensor, and the like, and the audio circuit may further include a speaker, a microphone, and the like.

An embodiment of this application further provides a processing apparatus, including a processor and an interface. The processor may be configured to perform the method in the foregoing method embodiments.

Figure 6:
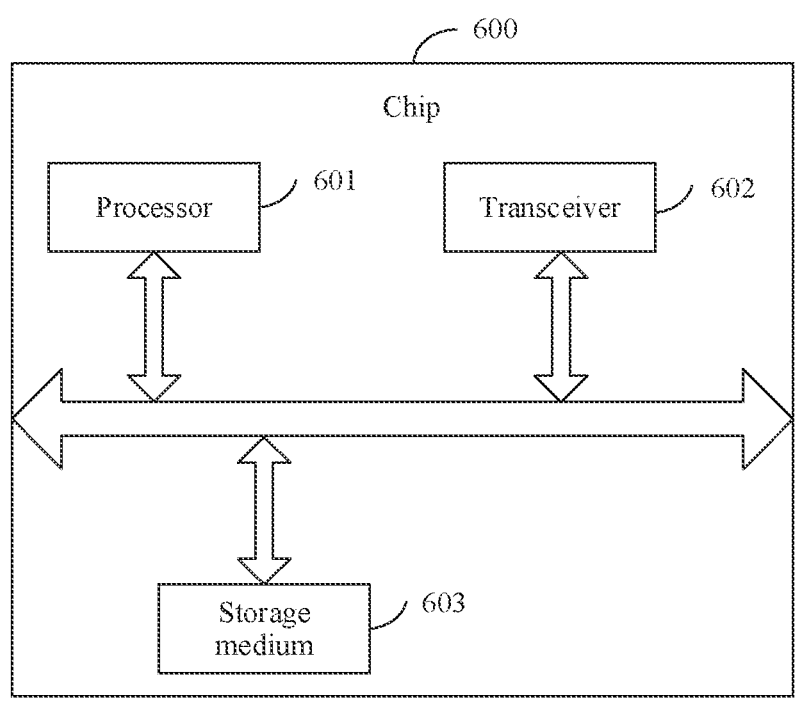
FIG. 6 is a block diagram of a structure of an implementation of a chip according to this application.

It should be understood that the processing apparatus may be a chip. For example, FIG. 6 is a block diagram of a structure of an implementation of a chip according to this application. The chip shown in FIG. 6 may be a general-purpose processor, or may be a dedicated processor. A chip 600 includes a processor 601. The processor 601 may be configured to support the apparatus shown in FIG. 5 in performing the technical solution shown in FIG. 1, FIG. 2, FIG. 3, or FIG. 4.

Optionally, the chip 600 may further include a transceiver 602. The transceiver 602 is configured to accept control of the processor 601, and is configured to support the apparatus shown in FIG. 5 in performing the technical solution shown in FIG. 1, FIG. 2, FIG. 3, or FIG. 4. Optionally, the chip 600 shown in FIG. 6 may further include a storage medium 603.

It should be noted that the chip shown in FIG. 6 may be implemented by using the following circuit or device: one or more field programmable gate arrays (field programmable gale arrays, FPGAs), a programmable logic device (programmable logic device, PLD), an application-specific integrated circuit (application-specific integrated circuit, ASIC), or a system on chip (system on chip, SoC), a central processing unit (central processing unit, CPU), a network processor (network processor, NP), a digital signal processor (digital signal processor, DSP), a micro controller unit (micro controller unit, MCU), a controller, a state machine, gate logic, a discrete hardware component, any other suitable circuit, or any combination of circuits that can perform various functions described in this application.

In an implementation process, steps in the foregoing methods can be implemented by using a hardware integrated logical circuit in the processor, or by using instructions in a form of software. The steps in the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. It is illustrated by way of example, and not limitation, that many forms of RAM are available, such as a static random access memory (Static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory of the systems and methods described in this specification includes but is not limited to these and any memory of another proper type.

According to the method provided in embodiments of this application, an embodiment of this application further provides a computer program product. The computer program product includes a computer program or instructions. When the computer program or the instructions are run on a computer, the computer is enabled to perform the method in any one of embodiments shown in FIG. 1, FIG. 2, FIG. 3, or FIG. 4.

According to the method provided in embodiments of this application, an embodiment of this application further provides a computer storage medium. The computer storage medium stores a computer program or instructions. When the computer program or the instructions are run on a computer, the computer is enabled to perform the method in any one of embodiments shown in FIG. 1, FIG. 2, FIG. 3, or FIG. 4.

All or some of the foregoing embodiments may be implemented by using software, hardware, firmware, or any combination thereof. When software is used to implement embodiments, all or some of embodiments may be implemented in a form of a computer program product. The computer program product includes one or more computer programs or instructions. When the computer program or the instructions are loaded and executed on the computer, the procedures or functions according to embodiments of this application are all or partially generated. The computer may be a general-purpose computer, a dedicated computer, a computer network, or other programmable apparatuses. The computer program or instructions may be stored in a computer-readable storage medium or may be transmitted from a computer-readable storage medium to another computer-readable storage medium. For example, the computer program or instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disc, SSD)), or the like.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

Persons of ordinary skill in the art may be aware that, various illustrative logical blocks (illustrative logical block) and steps (step) described with reference to embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The modules described as separate parts may or may not be physically separate, and parts displayed as modules may or may not be physical units, may be located in one position, or may be distributed on a plurality of network units. Some or all of the units may be selected based on actual requirements to achieve the objectives of the solutions in embodiments.

In addition, function modules in embodiments of this application may be integrated into one processing unit, each of the modules may exist alone physically, or two or more modules are integrated into one unit.

When the functions are implemented in the form of a software function unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The image generation apparatus, the terminal device, the computer storage medium, the computer program product, and the chip provided in embodiments of this application are all configured to perform the methods provided above. Therefore, for beneficial effects that can be achieved by the image generation apparatus, the terminal device, the computer storage medium, the computer program product, and the chip, refer to the beneficial effects corresponding to the methods provided above. Details are not described herein again.

It should be understood that, in embodiments of this application, an execution sequence of the steps should be determined based on functions and internal logic of the steps, and sequence numbers of the steps do not mean the execution sequence, and do not constitute a limitation on an implementation process of embodiments.

Embodiments in this specification are all described in a progressive manner, for same or similar parts in embodiments, refer to these embodiments, and each embodiment focuses on a difference from other embodiments. Particularly, embodiments of the image generation apparatus, the terminal device, the computer storage medium, the computer program product, and the chip are basically similar to the method embodiments, and therefore are described briefly. For related parts, refer to descriptions in the method embodiments.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

The foregoing descriptions are implementations of this application, but are not intended to limit the protection scope of this application.

What is claimed is:

1. An image generation method comprising:
   obtaining a first image of a photographed object, wherein the first image is a three-dimensional (3D) image of the photographed object;
   obtaining a first ambient light angle of the first image, wherein the first ambient light angle indicates a relative location relationship between an illumination light source in a photographing environment and the photographed object when the first image is photographed;
   obtaining first lighting information, wherein the first lighting information comprises a first illumination angle and a first light intensity, and wherein the first illumination angle is equal to the first ambient light angle;
   obtaining second images by photographing the photographed object from a plurality of angles of the photographed object, wherein the second images are two-dimensional (2D) images;
   obtaining second lighting information having a plurality of pieces, wherein each piece of second lighting information includes a different second illumination angle;
   generating a first 3D model of the photographed object through a first fusion based on depth information of the photographed object, the second images of the photographed object, the first lighting information, and the second lighting information, wherein the first 3D model corresponds to a second illumination angle that is the same as the first ambient light angle, and wherein a luminance corresponding to the first light intensity is greater than or equal to a preset luminance threshold; and
   generating a third image of the photographed object through a second fusion based on the first image and the first 3D model.

2. The image generation method of claim 1, further comprising:
   obtaining a preset second 3D model of the photographed object;
   obtaining the first lighting information; and
   further generating the first 3D model through a third fusion based on the first lighting information and the preset second 3D model.

3. The image generation method of claim 2, further comprising:
   obtaining the depth information; and
   generating the preset second 3D model through a fourth fusion based on the depth information and the plurality of second images.

4. The image generation method of claim 1, further comprising further generating the first 3D model from a plurality of preset third 3D models of a plurality of photographed objects based on the depth information and the second images.

5. The image generation method of claim 1, further comprising:
   obtaining an ambient light luminance of the photographed object;
   identifying that the ambient light luminance is less than the preset luminance threshold; and
   further obtaining, in response to identifying that the ambient light luminance is less than the preset luminance threshold, the first image and the first ambient light angle.

6. The image generation method of claim 1, further comprising:
   calibrating first key points on the first 3D model;
   matching second key points on the first image and the first key points to obtain a third 3D model; and
   further generating the third image through a third fusion based on the first image and the third 3D model.

7. An image generation apparatus comprising:
   a memory configured to store instructions; and
   a processor coupled to the memory and configured to execute the instructions to cause the image generation apparatus to:
   obtain a first image of a photographed object, wherein the first image is a three-dimensional (3D) image of the photographed object;
   obtain a first ambient light angle, wherein the first ambient light angle indicates a relative location relationship between an illumination light source in a photographing environment and the photographed object when the first image is photographed;
   obtain first lighting information, wherein the first lighting information comprises a first illumination angle and a first light intensity, and wherein the first illumination angle is equal to the first ambient light angle;
   obtain second images by photographing the photographed object from a plurality of angles of the photographed object, wherein the second images are two-dimensional (2D) images;
   obtain second lighting information having a plurality of pieces, wherein each piece of second lighting information includes a different second illumination angle;
   generate a first 3D model of the photographed object through a first fusion based on depth information of the photographed object, the second images of the photographed object, the first lighting information, and the second lighting information, wherein the first 3D model corresponds to a second illumination angle that is the same as the first ambient light angle, and wherein a luminance corresponding to the first light intensity is greater than or equal to a preset luminance threshold; and generate a third image of the photographed object through a second fusion based on the first image and the first 3D model.

8. The image generation apparatus of claim 7, wherein the processor is further configured to execute the instructions to cause the image generation apparatus to:

obtain a preset second 3D model that is of the photographed object and that is generated through a third fusion based on the depth information and the second images;

obtain the first lighting information; and generate the first 3D model through a fourth fusion based on the first lighting information and the preset second 3D model.

9. The image generation apparatus of claim 8, wherein the processor is further configured to execute the instructions to cause the image generation apparatus to:

obtain the depth information;

obtain the second images; and generate the preset second 3D model through the third fusion.

10. The image generation apparatus of claim 7, wherein the processor is further configured to execute the instructions to cause the image generation apparatus to further generate the first 3D model from a plurality of preset third 3D models of the photographed objects based on the depth information and the second images.

11. The image generation apparatus of claim 7, wherein the processor is further configured to execute the instructions to cause the image generation apparatus to:

obtain an ambient light luminance of the photographed object;

identify that the ambient light luminance is less than the preset luminance threshold; and further obtain, in response to identifying that the ambient light luminance is less than the preset luminance threshold, the first image and the first ambient light angle.

12. The image generation apparatus of claim 7, wherein the processor is further configured to execute the instructions to cause the image generation apparatus to:

calibrate first key points on the first 3D model;

match second key points on the first image and the first key points to obtain a third 3D model; and further generate the third image through a third fusion based on the first image and the third 3D model.

13. A computer program product comprising computer-executable instructions that are stored on a non-transitory computer-readable medium and that, when executed by a processor, cause an image generation apparatus to:

obtain a first image of a photographed object, wherein the first image is a three-dimensional (3D) image of the photographed object;

obtain a first ambient light angle, wherein the first ambient light angle indicates a relative location relationship between an illumination light source in a photographing environment and the photographed object when the first image is photographed; obtain first lighting information, wherein the first lighting information comprises a first illumination angle and a first light intensity, and wherein the first illumination angle is equal to the first ambient light angle;

obtain second images by photographing the photographed object from a plurality of angles of the photographed object, wherein the second images are two-dimensional (2D) images;

obtain second lighting information having a plurality of pieces, wherein each piece of second lighting information includes a different second illumination angle;

generate a first 3D model of the photographed object through a first fusion based on depth information of the photographed object, the second images of the photographed object, the first lighting information, and the second lighting information, wherein the first 3D model corresponds to a second illumination angle that is the same as the first ambient light angle, and wherein a luminance corresponding to the first light intensity is greater than or equal to a preset luminance threshold; and generate a third image of the photographed object through a second fusion based on the first image and the first 3D model.

14. The computer program product of claim 13, wherein the computer-executable instructions further cause the image generation apparatus to:

obtain a preset second 3D model that is of the photographed object and that is generated through a third fusion based on the depth information and the second images;

obtain the first lighting information; and generate the first 3D model through a fourth fusion based on the first lighting information and the preset second 3D model.

15. The computer program product of claim 14, wherein the computer-executable instructions further cause the image generation apparatus to:

obtain the depth information;

obtain the second images; and generate the preset second 3D model through the third fusion.

16. The computer program product of claim 13, wherein the computer-executable instructions further cause the image generation apparatus to further obtain the first 3D model from a plurality of preset third 3D models that is of a plurality of photographed objects and that is generated based on the depth information and the second images.

17. The computer program product of claim 13, wherein the computer-executable instructions further cause the image generation apparatus to:

obtain an ambient light luminance of the photographed object;

identify that the ambient light luminance is less than the preset luminance threshold; and further obtain, in response to identifying that the ambient light luminance is less than the preset luminance threshold, the first image and the first ambient light angle.

18. The computer program product of claim 13, wherein the computer-executable instructions further cause the image generation apparatus to:

calibrate first key points on the first 3D model;

match second key points on the first image and the first key points to obtain a third 3D model; and further generate the third image through a third fusion based on the first image and the third 3D model.

19. The computer program product of claim 18, wherein the first key points comprise eyes, a nose, and a mouth.

20. The computer program product of claim 18, wherein the second key points comprise eyes, a nose, and a mouth.

* * * * *